United States Patent Office 2,921,827
Patented Jan. 19, 1960

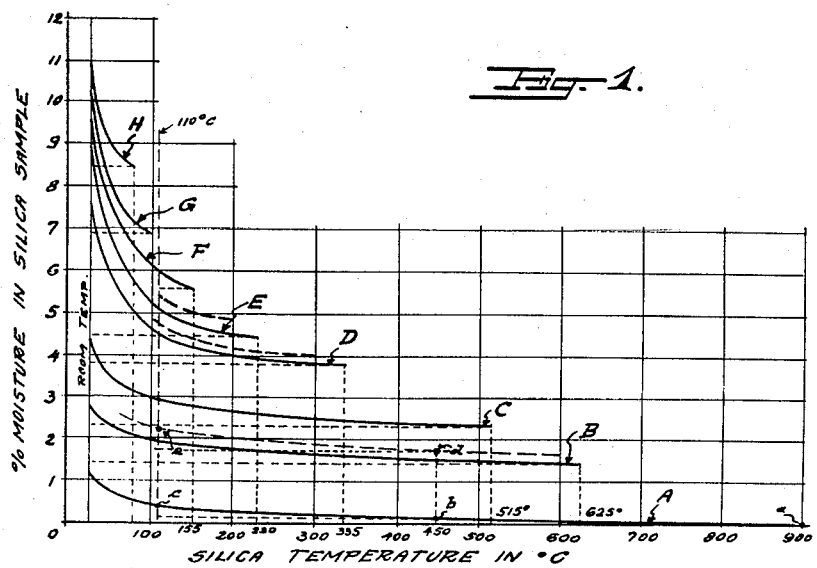
Fig. 1.
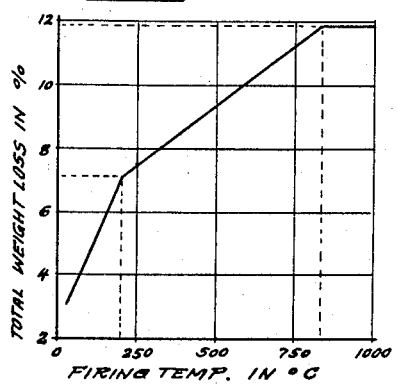
Fig. 2.
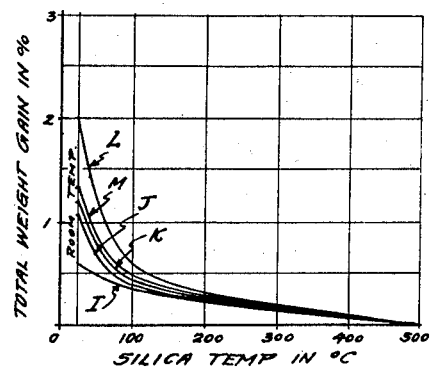
Fig. 3.
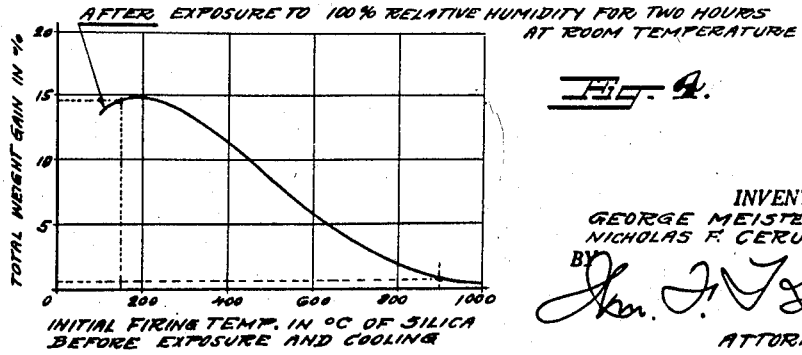
Fig. 4.
INVENTORS
GEORGE MEISTER and
NICHOLAS F. CERULLI.
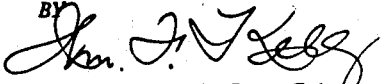
ATTORNEY.

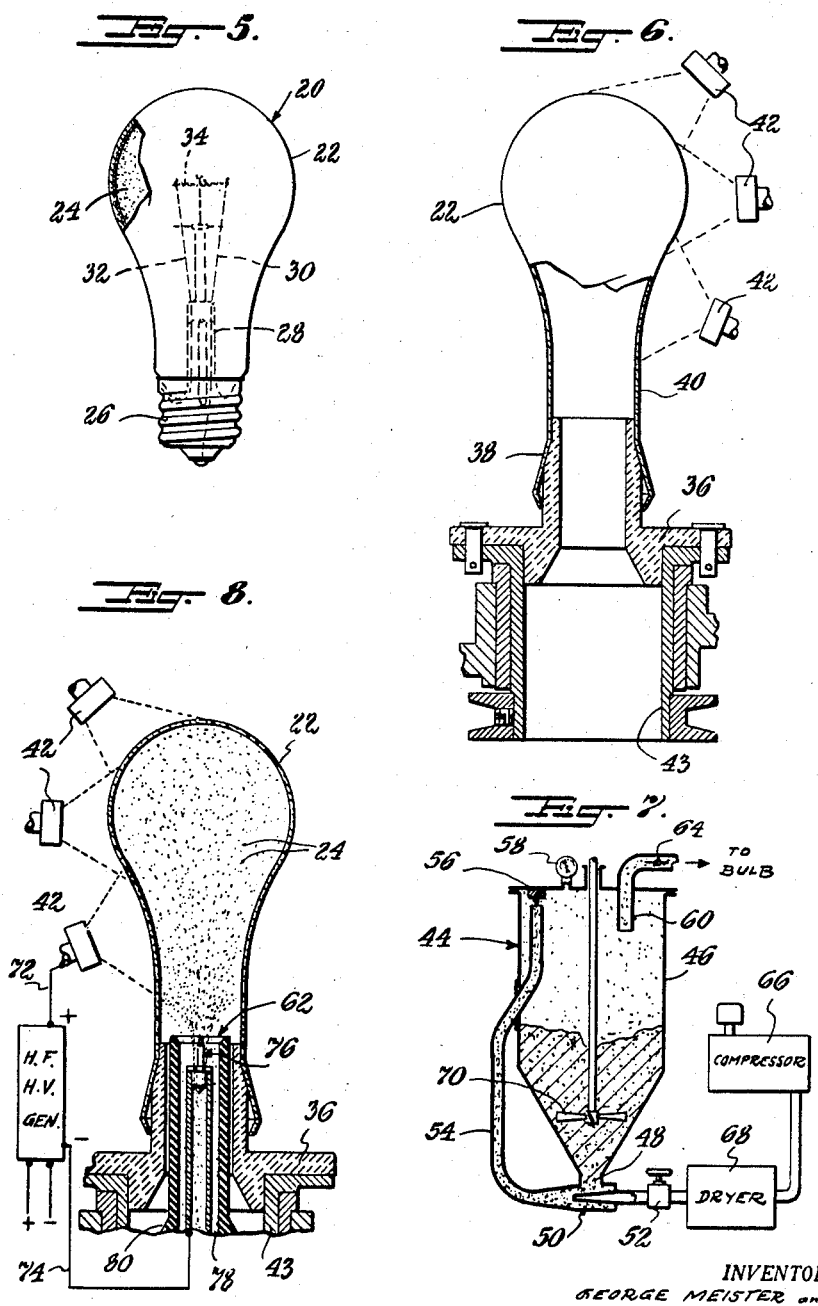

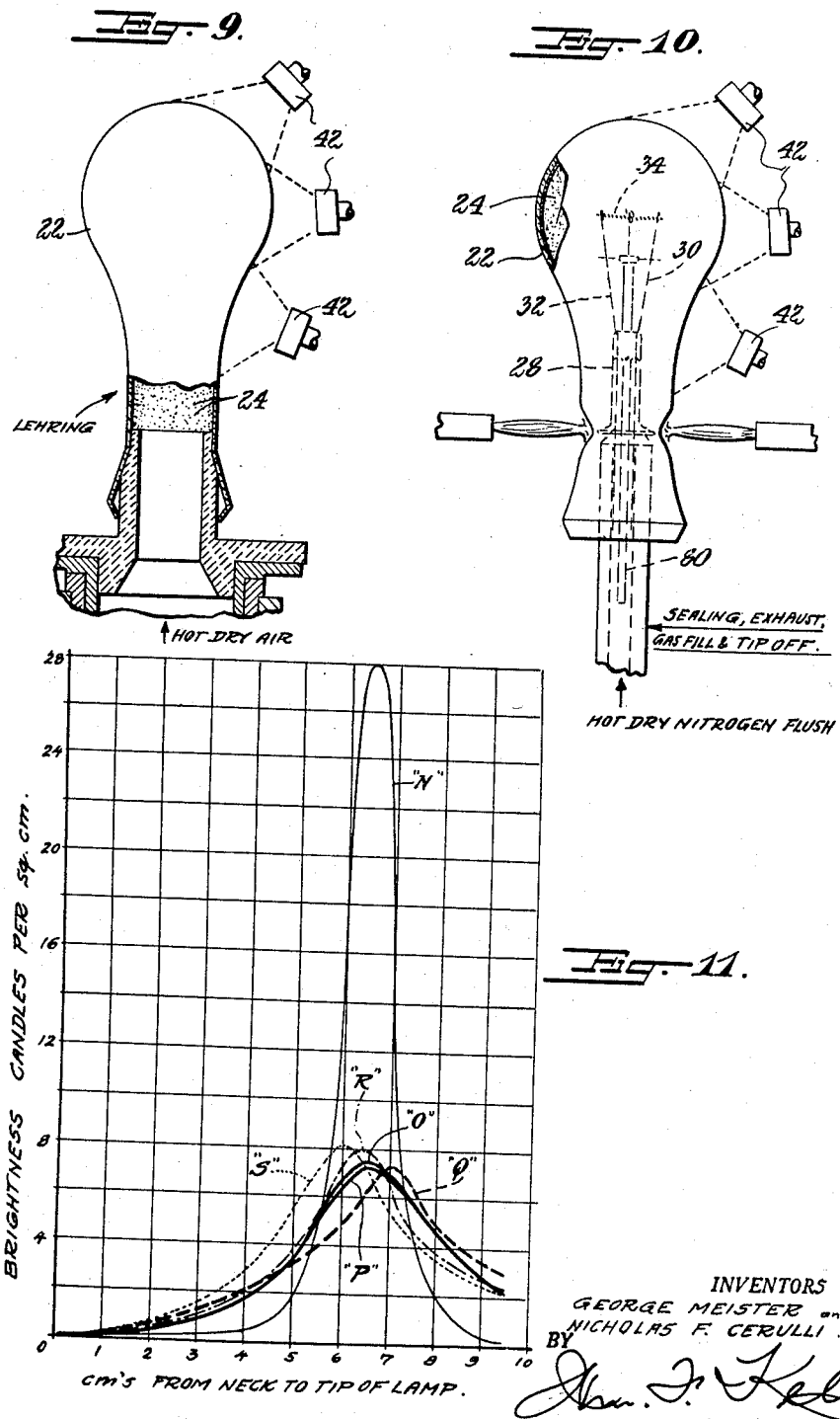

2,921,827

METHOD FOR MANUFACTURING INCANDESCENT LAMPS

George Meister, Newark, and Nicholas F. Cerulli, Caldwell, N.J., assignors to Westinghouse Electric Corporation, East Pittsburgh, Pa., a corporation of Pennsylvania Original application January 20, 1956, Serial No. 560,441. Divided and this application September 30, 1957, Serial No. 692,953

4 Claims. (Cl. 316—12)

This invention relates to incandescent lamps and, more particularly, to diffusing coatings for incandescent lamp envelopes and to a process for applying a diffusing coating to an incandescent lamp envelope and is a division of application Serial No. 560,441, filed Jan. 20, 1956, entitled "Incandescent Lamp" which application is a continuation-in-part of application Serial No. 444,316, filed July 19, 1954, now abandoned, titled "Incandescent Lamp with Light Diffusing Coating and Method of Manufacture" by the co-inventors herein.

Heretofore commercially-available incandescent lamps with a finely-divided, light-diffusing envelope coating have had a silica coating applied to the lamp envelope by methods as outlined in U.S. Patent No. 2,545,896 to Pipkin, by flushing processes, or as outlined in U.S. Patent No. 2,661,438 to Shand. In the flush-coating processes of the prior art, finely-divided silicon dioxide (silica) is suspended in a volatile solvent such as butyl acetate with a binder such as nitrocellulose to impart the desired coating viscosity. In such flush-coating processes the silica must be maintained substantially free from moisture, or such moisture will react with the nitrocellulose binder which is water insoluble and deleteriously affect the resulting coating. The process for removing moisture from finely-divided silica before flush coating has entailed baking the silica at relatively high temperatures, for example, 825° C., or higher, and, as will hereinafter be explained, such baking of the silica deleteriously affects the maintenance of the finished or processed silica-coated lamps.

In the silica-coated lamps prepared by the process of burning organo-silicates to form a fume or smoke, as disclosed by Pipkin in his patent, the resulting silica formed by the burning is quite inert with regard to moisture-repossessing characteristics. Further, the cost of organo-silicates is relatively high and the cost of commercially-available, finely-divided silica is roughly one quarter that of the organo-silicate, which lower cost favors the flush-coating methods of the prior art which can use commercially-available silica. However, the solvents which are used in the flush method, butyl acetate, for example, are relatively expensive, which somewhat decreases the cost advantage realized through using a commercially-available silica in a flush-coating process.

In the silica-coated lamps as prepared by the process of spraying onto a heated bulb an alkaline-reacting silica aquasol carrying large silica particles, as disclosed in the Shand patent, the silica coating is relatively inert to moisture-repossessing ability, which apparently is attributable either to the structure of the silica which results from the method of preparing the silica gel or to the method of applying the coating to the bulb. Silica aquasols are also relatively expensive as compared to commercially-available silica since considerable processing is required, and in addition silica aquasols containing some large silica particles must be used in relatively large amounts on the incandescent lamp envelope in order to achieve adequate light diffusion.

It is the general object of this invention to provide a method for applying a finely-divided, light-diffusing coating to an incandescent lamp envelope, which will result in improved performance for the completed lamp.

It is another object of this invention to provide a method of making a silica-coated incandescent lamp which has improved lumen maintenance.

It is still another object to provide a method for electrostatically applying a finely-divided, light-diffusing material to an incandescent lamp envelope whereby the resulting lamp displays improved lumen maintenance.

The aforesaid objects of the invention, and other objects which will become apparent as the description proceeds, are achieved by providing a method for coating light-diffusing silica onto an incandescent lamp envelope so that it acts as a moisture getter to improve the lumen maintenance of the finished lamp.

For a better understanding of the invention, reference should be had to the accompanying drawings wherein:

Fig. 1 is a graph of silica moisture content vs. silica temperature for samples of silica powder cooled from various firing temperatures;

Fig. 2 is a graph representing silica moisture loss vs. firing temperature for a silica powder;

Fig. 3 represents moisture repossessing abilities for various types of silica substances;

Fig. 4 represents moisture gain under 100% relative humidity conditions for samples of silica powders initially fired at various temperatures;

Fig. 5 illustrates a silica-coated incandescent lamp;

Fig. 6 represents a first step in the electrostatic coating process;

Fig. 7 represents a coating-material smoke generator;

Fig. 8 illustrates the coating operation for electrostatically applying the coating material to the lamp envelope;

Fig. 9 illustrates the bulb-lehring operation following the coating operation;

Fig. 10 represents the sealing-in operation following bulb lehring;

Fig. 11 is a graph representing observed brightness for various types of silica-coated envelopes vs. distance from neck to top of bulb, i.e., the candle power distribution for silica-coated envelopes;

Commercially-available silica is normally prepared by precipitating silica from a silicate by means of an acid, for example by precipitating silica from sodium silicate by means of hydrochloric acid. Such silica is substantially white, porous, generally amorphous and normally inherently spherical in configuration as far as the ultimate particles are concerned. By the descriptive term, generally amorphous, it is meant that X-ray diffraction patterns do not show sharply-defined lines. Also, the porous nature of the silica is another way of stating that the ultimate particles are loosely packed.

The precipitated silica will normally have a relatively high moisture content which may vary from 6 to 15% by weight, for example. However, the commercially-available silica should possess or have at least 1.7% by weight of moisture when heated to 200° C. in order to provide an improved lumen maintenance for the processed lamp. Whether the moisture in the silica as received is absorbed or adsorbed is not definite, but it is probable that the moisture is possessed by the silica as both absorbed and adsorbed moisture. Of course, if the silica has been baked or fired during processing, the moisture content may vary considerably. The following discussion of the moisture-possessing and repossessing properties of silica is based on test data performed on silica which has not been baked or fired by the commercial supplier during initial processing or preparation or in any other way subjected to a moisture-removing process which renders the silica relatively inert with respect to moisture repossession, hereinafter explained.

Extensive tests have been conducted on commercially-available silica which has a moisture content of about 12% by weight, which 12% represents an average moisture content for such silicas. In order to determine the total moisture content of the finely-divided silica, as received, a sample is accurately weighed, then fired at about 1000° C. until no more weight loss is observed. The 1000° C. fired sample is then reweighed before it can regain any moisture from the atmosphere. The weight difference in the silica before and after firing at 1000° C. represents the moisture content of the original sample and may be called the "loss on ignition," as it is known in the art.

The moisture-possessing and repossessing characteristics of silica are very unusual and extensive tests have been conducted on these characteristics, the results of which tests are graphically represented in Figs. 1, 2, 3 and 4, wherein moisture content is plotted vs. the silica temperature with the initial silica firing temperatures also being indicated. In conducting the tests which provided the accumulated data as represented in the curves of Figs. 1–4, silica samples were heated to predetermined temperatures, for example to 900° C., until a constant weight for the 900° C. fired sample was obtained. This firing temperature of 900° C. is represented at point (a) in Fig. 1. The sample was weighed after firing and before it could acquire or repossess any moisture from the atmosphere. The sample was then allowed to cool slowly under normal room conditions of temperature and humidity (25° C. and 30–50% relative humidity) and a gradual weight gain was observed as the sample slowly cooled and acquired moisture from the atmosphere. When the sample reached room temperature the test was stopped. The results of this 900° C. test are illustrated in the lowermost curve (Curve "A") of Fig. 1 and, as shown, the 900° C. fired sample regained a total weight of only 1.15%. Similar tests were conducted at firing temperatures of 625° C., 515° C., 335° C., 230° C., 155° C., 100° C. and 65° C. In each of these tests the silica powders were first maintained at the designated firing temperatures until no further weight losses from the samples were observed. The samples were then allowed to cool slowly at normal room conditions of temperature and humidity until room temperature was attained, whereupon the tests were stopped. The results of these tests are also graphically represented in Fig. 1 by the curves "B," "C," "D," "E," "F," "G" and "H."

An analysis of the curves represented in Fig. 1 indicates that the higher the firing temperature for silica powder, the less the moisture which will be resorbed as the silica cools down to room temperatures. Also, a silica powder which has been fired until no additional weight loss is observed (i.e., when steady-state conditions are obtained) has the ability to repossess only a certain limited amount of moisture. For example, a 515° C. fired powder on being cooled to room temperature can repossess about 2.0% by weight of moisture. If the same 515° C. fired powder were cooled only to 110° C. in the absence of moisture, it would have the ability to repossess 0.65% by weight of moisture. Referring to powders which are fired at other than 515° C., assuming that the fired powders are maintained under substantially moisture-free conditions after firing, the moisture-repossessing abilities at 110° C. are as follows: 0.40% by weight for 9000° C. fired powder, 0.5% by weight for 625° C. fired powder, 0.7% by weight for 335° C. fired powder, 0.65% by weight for 230° C. fired powder and 0.4% by weight for 155° C. fired powder. It can thus be seen that as silica powder is fired at higher and higher temperatures it tends to lose its moisture-repossessing characteristics and when cooled to 110° C. the moisture repossession approaches a maximum for silica powders fired at from about 230° C. to 515° C.

There is illustrated in Fig. 2 a curve showing moisture loss vs. firing temperatures for silica powders which originally possessed approximately 12% by weight of moisture. Ordinates on this curve were determined by firing powders at the temperatures as indicated until no more weight loss was observed (i.e., when steady-state conditions were reached). As illustrated, the moisture loss generally follows three straight lines, from room temperature up to 200° C. firing temperature it is theorized that the loss is primarily adsorbed moisture. From 200° C. to 825° C. it is theorized that the moisture loss is primarily absorbed moisture, and above approximately 825° C. there is substantially no moisture remaining in the silica.

The foregoing illustrations of the moisture-repossessing characteristics of silica may be briefly summarized by noting that when a silica, baked or otherwise exposed to a moisture-removing process, in accordance with the teachings of this invention, is maintained under substantially moisture-free conditions, such silica will have an ability to repossess additional moisture, and indeed will act as a moisture getter. At higher firing temperatures, however, the silica loses its "moisture gettering characteristics."

Other materials which have been used to coat lamps to form diffusing coatings do not exhibit these moisture-repossessing characteristics to such a degree. For example, there are illustrated in Fig. 3 curves showing the moisture-repossessing abilities of sodium silicate, silica which is formed by burning ethyl orthosilicate, a silica aquasol containing large silica particles, and for purposes of comparison, a 900° C. fired silica powder, a 625° C. fired silica powder and a 500° C. fired silica powder. As illustrated in curve "I" of Fig. 3 when heated to 500° C. and then allowed to cool to room temperature under normal room conditions, silica formed by burning ethyl silicate is relatively inert with regard to repossession of moisture, since such silica gains only 0.6% by weight of moisture. Sodium silicate when fired at 500° C. and cooled under the same conditions repossessed only 1.05% of weight by moisture, as illustrated in curve "J" of Fig. 3. An alkaline-reacting silica aquasol containing colloidal silica admixed with a limited amount of larger silica particles for purposes of light diffusion, and prepared as outlined in the aforementioned Shand patent, when fired at 500° C. and allowed to cool to room temperature, will repossess only 1.2% by weight of moisture, as illustrated in curve "K" of Fig. 3. A 900° C. fired silica powder, when later fired at 500° C. and allowed to cool to room temperature will repossess only 1.05% by weight of moisture as shown in curve "J" of Fig. 3, i.e., it displays the same characteristics as sodium silicate. A 500° C. fired silica powder (curve "L") and a 625° C. fired silica powder (curve "M") when refired at 500° C. and allowed to cool at room temperature will respectively gain 2.0% and 1.3% by weight of moisture.

The inertness of the silica formed by burning ethyl silicate is attributed to the very high flame temperature of ethyl silicate (1320 kilocalories per mole liberated to form $SiO_2$, $CO_2$ and $H_2O$) and it has been shown that the higher the temperature to which silica is exposed the more inert with regard to moisture repossession it becomes. The inertness of sodium silicate with regard to moisture-repossession ability is attributed to the fact that sodium silicate is an entirely different compound from silica, and cannot be expected to display the same physical properties. The relative inertness with respect to moisture repossession of the admixture of alkaline-reacting silica aquasol and large silica particles is attributed either to the silica-gel structure, or to the method of applying the coating wherein the gel has an apparent tendency to frit itself when sprayed onto a hot bulb, as outlined in the aforementioned Shand patent. The relative inertness of the 900° C. fired powder with respect to moisture repossession is attributed to a basic structural change in the highly-fired, finely-divided silica powder, which structural change is not definitely understood. Even when a 900° C. fired silica powder is allowed to remain at normal room temperatures and humidity for for periods of months, it will repossess very little moisture.

As a further illustration of the moisture-repossessing characteristics of finely-divided silica, various fired samples were allowed to cool to room temperature while maintained under substantially moisture-free conditions. These fired samples were then exposed to 100% humidity for two hours and the percent moisture gain in weight was measured. This percent moisture gain in weight is plotted vs. initial firing temperatures in Fig. 4 and, as illustrated, a 900° C. fired powder gains only about 0.7% by weight and the 150° C. fired powder gains 14.5% by weight of moisture. It should be noted that on firing silica, substantially all moisture is driven off at about 825° C. and firing at higher temperatures does not result in any further moisture loss. However, firing at temperatures in excess of 825° C. does render the silica more inert to repossession of moisture and this is illustrated in Fig. 4 where the 1000° C. fired powder is shown to be more inert toward moisture repossession than the 825° C. fired powder.

It is deemed proper to note that ever since the first days of the incandescent lamp, engineers have resorted to all conceivable means and mechanisms to remove all possible moisture from the finished lamp. This is because any moisture present in the finished lamp tends to set up the well-known, so-called water cycle with the tungsten filament during lamp operation. In this water cycle, the moisture reacts with the hot tungsten filament to form tungsten oxides and release atomic hydrogen. The tungsten oxides deposits on the envelope surface. The atomic hydrogen reacts with oxygen present in the deposited tungsten oxides to form a black tungsten deposit on the envelope and more water vapor, and so on, until the envelope is quite blackened and relatively opaque. This problem has existed with acid-etched bulbs, as well as silica-coated bulbs.

It has been found that by using a silica coating in accordance with the teachings of this invention, there is provided a diffusing coating which also acts as a moisture getter and which will inhibit the heretofore-mentioned water cycle. Thus, the lumen maintenance under normal-operating conditions for the silica-coated lamps of this invention is measurably improved over the lumen-maintenance under normal-operating conditions for all lamps of the prior art. The prior art has taught that all possible moisture should be removed from the processed lamp in order to produce the best possible normal-operation lumen-maintenance. In this case, however, removal of all moisture from the silica impairs its moisture-gettering action.

Silica-coated lamps have been prepared under the same conditions except that some of the lamps were coated with 900° C. fired silica powder and other lamps were coated with 600° C. fired silica powder, both powder firings being prior to the envelope coating step. Of course, after firing at the designated temperatures and during lamp processing, the fired powders were maintained as moisture-free as possible. The 600° C. fired silica coated lamps had a 70% normal-life lumen-maintenance which was appreciably greater than the 70% normal-life lumen-maintenance of the lamps coated with the 900° C. fired powder. It is significant to note that all lamps which were coated with the two powders were prepared under the same controlled conditions and the maintenance improvement can thus be attributed solely to the fact that the powders were processed by firing at different temperatures before being coated on the lamp envelope.

In explanation of the term 70% normal-life lumen-maintenance, which term is well-known through the lamp art, it is generally accepted that the lumen output of a lamp, when measured at 70% of its normal life, is an accurate indication of the performance which is to be expected throughout the life of the lamp. In control tests for determining the 70% normal-life lumen-maintenance, the initial lumen output of the lamp is corrected for any variations in actual lamp life from the rated lamp life, as is customary in the lamp art.

The foregoing tests, and all normal-life tests herein referred to, were conducted on 100 watt lamps burned in a base-upward position, which is the usual service operating position for 100 watt lamps. The bulb temperatures for such lamps when burned in such a position vary considerably from one portion of the bulb to another, but the minimum bulb temperature as measured with a pre-heated thermocouple is approximately 110° C. In the following discussion the normal-operation minimum envelope temperatures will be considered, since the silica coating at the coolest portion of the lamp envelope has the greatest moisture-repossessing ability, which moisture-repossessing ability results in the improved normal-life lumen-maintenance, as will be further discussed.

Refering now to the curves illustrated in Fig. 1, where the 900° C. fired powder is coated onto a bulb it must necessarily be subjected to temperatures during lamp processing which are sufficiently below the deformation temperature of the soft glass envelope so that the envelope will not be damaged during processing. Assuming the coated lamp envelope is baked or lehred at about 450° C. during processing (this lehring temperature was employed in processing the lamps), a 900° C. fired powder will have the opportunity to gain or repossess approximately 0.15% by weight of moisture (e.g., note the differences in values of moisture content between the ordinates of points (a) and (b) on the curve "A" of Fig. 1, wherein a 900° C. fired powder on cooling to 450° C. can acquire about 0.15% by weight of moisture). On further cooling to 110° C. a 900° C. fired powder will have the ability to accumulate or repossess an additional 0.25% by weight of moisture (i.e., the difference in ordinate values of points (b) and (c) on the 900° C. fired powder curve "A." A 600° C. fired powder, in contrast, on cooling from 450° C. to 110° C. has the ability to accumulate an additional 0.45% by weight of moisture (e.g. note the ordinate differences between points (d) and (e) obtained by extrapolation between the 625° C. and 515° C. fired powder curves). Since the lumen-maintenance for the 600° C. silica coated lamps are appreciably better than the lumen maintenance for the 900° C. silica coated lamps, which lamps were processed the same except for the silica powder, it would seem to follow ipso facto that the additional moisture repossessing ability of the 600° C. silica, as compared to the 900° C. silica, is responsible for the improved lamp lumen-maintenance characteristics.

It should be noted that the tenacity with which silica getters and holds small amounts of moisture apparently increases greatly as the silica becomes more "moisture hungry." Thus, a relatively small increase in "moisture gettering ability," expressed as a percent by weight, represents a very large increase in the tenacity with which silica getters and holds moisture.

It has been found that in order to have a 70% normal-life lumen-maintenance which is appreciably better than the corresponding normal-life lumen-maintenance of prior art lamps, the silica coating must have a moisture content which is at least equivalent to the moisture content of a 625° C. fired silica powder which has the ability to repossess an additional 0.4% by weight of moisture at minimum lamp envelope operating temperatures. The total moisture content for a 625° C. fired powder, before such powder is allowed to repossess any moisture is about 1.4% by weight. At 450° C., under normal room conditions, the total moisture content for this 625° C. fired powder will be about 1.55% by weight and if the coated envelope were lehred during lamp processing to about 450° C., under normal-room conditions, the total moisture content for this 625° C. fired powder would thus be about 1.55% by weight. Assuming the lamp is tipped-off while the moisture content of 625° C. silica is maintained at not greater than 1.55% the silica will still possess an ability to accumulate an additional 0.4% by weight of moisture at 110° C., which is the normal-operation minimum envelope temperature for a 100 watt lamp, and which 0.4% represents the "moisture gettering abilities" of the coated 625° C. fired powder when processed into a finished lamp. When higher fired silicas are processed into a finished lamp their potential "moisture gettering abilities" are so limited as to minimize any maintenance improvement which may be realized through the so-called silica "moisture gettering action." Since this "moisture gettering action" results in improved 70% normal-life lumen-maintenance, the silica coating must have at least 1.55% by weight of moisture and the ability to repossess an additional 0.4% by weight of moisture at normal-operation minimum envelope temperatures. This establishes a lower range for moisture content in the silica coating and the "minimum moisture gettering ability" which the silica coating must possess.

At the upper permissible moisture content limitation for the silica coating it would seem possible to use any silica which has been subjected just prior to lamp tip-off to temperatures which are reasonably in excess of the normal-operation minimum lamp envelope temperature of 110° C. For example, the lamp could be baked just prior to exhaust and tip-off at a temperature of 200° C., which would result in a moisture gettering ability for the silica coating of approximately 0.5% by weight at normal-operation minimum envelope temperatures (this figure is obtained by extrapolation between the 230° C. and 155° C. curves designated "E" and "F" in Fig. 1). This of course does not take into account the operation of lamps in enclosed or recessed type fixtures where the minimum lamp envelope temperature may be as high as 225° C. If a coated 200° C. fired powder, having a moisture content of approximately 4.8% was exposed to a temperature of about 225° C., as in a recessed fixture, the coating of 200° C. fired silica would have the ability to give off approximately 0.3% by weight of moisture, resulting in some lamp-blackening and decreased lumen maintenance for such applications. However, silica-coated lamps are now sold at a premium price and are normally intended to be used in fixtures where their esthetic, even appearance will be visible. Thus silica-coated lamps having a moisture content as high as 4.8% will still be very acceptable for normal operation where the minimum envelope temperature is 110° C., provided such silica also has the ability to repossess at least 0.4% by weight of additional moisture. Such lamps will thus show an increased 70% normal-life lumen-maintenance over the silica coated lamps of the prior art and this normal-life lumen-maintenance improvement will more than offset any increased blackening encountered in recessed or other hot-fixture applications.

It can thus be stated that in order to show an appreciable improvement in 70% normal-life lumen-maintenance, the silica coating must possess at least 1.55% by weight of moisture and not more than 4.8% by weight of moisture, and in addition must have the ability to possess at least 0.4% by weight of additional moisture at normal-operation minimum lamp envelope temperatures.

If it is desired to process the lamp so that its performance in special-type recessed or other hot fixtures will be at least as good as the performance of the inside-frost lamps of the prior art, it is necessary to limit the moisture content of the silica coating to not more than 4.0% by weight, or otherwise expressed, the moisture content of the silica coating should be equivalent to the moisture content of about a 300° C. fired silica (extrapolating between curves "D" and "E" of Fig. 1). Of course the silica should still have the ability to repossess at least 0.4% by weight of additional moisture at normal-operation minimum lamp envelope temperatures if the lumen maintenance is to be improved over the lamps of the prior art.

Following is a table, designated Table I, in which are listed 70% normal-life, lumen-maintenance figures for types of lamps which are commercially available and for a representative silica-coated lamp of this invention.

| Lamp type | 70% normal-life maintenance (indicated as a percentage of the initial lumens per watt) |
|---|---|
| Inside-frost type bulb | 93.8 |
| Silica-coated bulb (formed by burning ethyl orthosilicate) | 93.7 |
| Silica-coated bulb (900° C. fired powder coated by flush) | 92.7 |
| Silica-coated bulb (silica aquasol-large silica particle mixture sprayed on hot bulb) | 92.0 |
| Silica-coated bulb (450° C. fired powder) | 95.2 |

An electrostatic process is preferable for coating onto a bulb finely-divided silica which possesses limited and controlled amounts of moisture and an apparatus for electrostatically coating silica onto an envelope and further processing the coated envelope is illustrated in Figs. 6–9.

As heretofore noted, silica possessing substantial amounts of moisture cannot be coated onto a bulb by the flush methods of the prior art since the organic binders which are necessary to impart the desired viscosity to the coating composition are not water soluble and are deleteriously affected by any appreciable amounts of water in the silica. Thus where flush methods are used to coat lamps, 825° C. to 1000° C. fired powder should be used to substantially eliminate the moisture possessed by the silica.

In Fig. 5 is illustrated a silica-coated incandescent lamp 20 comprising a vitreous, light-transmitting envelope 22 carrying an internal coating of moisture-containing, finely-divided silica 24 and having a mount sealed to the neck thereof. A brass or aluminum screw-type base 26 is cemented to the neck to facilitate connection to a power source, as is usual. As is well known, the mount comprises a vitreous re-entrant stem press 28 having lead-in conductors 30 and 32 sealed there-through and supporting a refractory metal filament 34, such as tungsten, between their inwardly extending extremities. The envelope preferably contains inert gases such as nitrogen, argon, krypton, etc., or mixtures thereof, as is well-known, although the lamp may be a vacuum type, if desired.

In electrostatically applying the diffusing silica coating to the inner surface of the unsealed bulb, the open-necked bulb is first placed under and supported by a hollow lava chuck 36, as illustrated in Fig. 6, which chuck cooperates with the bulb cullet 38 and bulb neck 40 to support the bulb. While thus supported, the bulb is rotated either manually or by a belt drive (drive unit not shown) and heated by gas-air burners 42 to approximately 100° C. Because of the negative temperature coefficient of electrical resistance of glass, this heating renders the envelope substantially uniformly electrically-conductive. The heating temperature of 100° C. is given only by way of example and not by way of limitation since the temperature to which the glass is heated to render it substantially uniformly electrically-conductive is not particularly critical and may be varied considerably, according to the type of glass being heated, for example, temperature extremes of 70° C. to 300° C. have been used, although these temperatures are not intended to be limiting. It should be noted that most incandescent lamp bulbs are fabricated of the well-known lime glass.

As illustrated, the insulating lava chuck 36 of the electrostatic coating apparatus is affixed to a collar 43, which is insulated from the bulb by the chuck, to allow the bulb to be rotated readily, either manually or automatically, during the heating and later steps of the process.

There is illustrated in Fig. 7 a smoke generator unit 44 for producing a smoke of finely-divided particles suspended in air, prior to electrostatic deposition of the powder. The smoke generator comprises generally a powder and smoke reservoir 46 having an outlet 48 at the bottom thereof through which the finely-divided material is admitted into a mixing venturi 50. Compressed air is admitted to the venturi through a pressure-regulating valve 52 and thence to the venturi where the finely-divided material is picked up and carried through a feed conduit 54 to cause the air-particle mixture to impinge upon a target 56 to break-up agglomerates which might have formed and to disperse thoroughly the coating material to form a smoke of finely-divided particles suspended in the air vehicle.

The powder before being placed in the smoke generator unit must be finely-divided and may be ground in an air-velocity type grinder such as marketed under the trademark "Micronizer" by Sturtevant Mill Co., Boston, Mass., or as marketed under the trademark "Wheeler Mill" by C. H. Wheeler Mfg. Co., Philadelphia, Pa. This breaks up the overly-large particle agglomerates.

For the specific embodiment of the particle smoke nozzle, which will hereinafter be illustrated and described, it is preferable to maintain a particle-smoke pressure within the reservoir 46 between 6 and 12 pounds during coating to cause the particle-smoke to pass through the smoke nozzle at a desirable velocity. To maintain the smoke pressure in the reservoir within these aforementioned preferred pressure limitations, an indicating gauge 58 is provided from which the operator may have a visual indication so that the pressure-regulating valve 52 may be manually adjusted to maintain the smoke pressure in the reservoir within the aforementioned preferred pressure limitations. Such pressure-indicating and pressure-regulating valves are well-known. A smoke-nozzle conduit 60 connects the smoke reservoir with the injector nozzle assembly 62, as shown in Fig. 8. To control the flow of smoke to the nozzle assembly, a manually-operable butterfly valve 64 is provided in the conduit 60.

The air compressor 66 which supplies air to the smoke-generator unit is preferably regulable between 2 lbs. and 20 lbs. output pressure and an air dryer 68, such as a well-known, aluminum-oxide type air dryer is provided in the output line of the compressor so that the particle powder may be maintained under substantially water-vapor-free conditions until it is forced into the uncoated bulb. A power-driven agitator 70 (power source not shown) is provided near the base of the reservoir to agitate continually the finely-divided coating material to keep it in a finely-divided state by breaking up the largest particle agglomerates.

In order to control better the moisture content of commercially-available silica used in coating, the powder may be baked, if desired, before coating, although the moisture possessed by the silica may be carefully controlled by lehring or baking the coated bulbs after the coating operation and before sealing in and/or exhaust. The only limitation to powder baking before coating is that the baking temperature should not exceed 625° C. so as to impair the potential moisture-gettering properties of the silica as processed into the lamps, as heretofore explained.

In Fig. 8 is shown the coating operation for the bulb. The positive pole 72 of a high-tension, direct-current source is electrically connected to the gas-burner unit 42 and the negative pole 74 is electrically connected to a probe 76 which projects through the hollow-lava chuck 36 into the lower extremities of the bulb neck. If desired these polarities may be reversed with but little effect on the resultant coating. The magnitude of the applied D.C. voltage is not particularly critical and may vary between about 8 kv. and 25 kv., for example, a specific example being 15 kv.

The particle smoke injector nozzle assembly 62 is circumferentially disposed about the probe 76, and the nozzle assembly connects with the nozzle conduit 60 of the smoke generator. The air which is present in the bulb and the particle smoke which does not deposit on the bulb wall during coating passes through a return conduit 78 which is disposed about the nozzle assembly 62 and the nozzle conduit 60 and which discharges into a collecting hopper (not shown) so as to collect the uncoated particles for reprocessing and further use. A conduit support collar 80 supports the probe- and nozzle-conduit assemblies and may be positioned longitudinally with respect to the lava chuck and bulb neck either manually or automatically.

It has been found that the particle smoke must be forced through the nozzles of the nozzle assembly in order to coat properly for when the nozzle assembly is removed and the particle smoke is passed through the nozzle conduit into the heated bulb an imperfect coating results. It is thus theorized that the particles when passing through the nozzles are frictionally charged and the application of the high voltage merely attracts the particles carrying an opposite charge to the bulb wall where the charge on the particles is dropped. In support of this, tests were conducted with silica where the applied uni-directional potential was varied between 8 kv. and 25 kv. with no observed difference in the amount of silica which was deposited (i.e., the coating weight on the bulb wall) at the extremes of the 8 kv. to 25 kv. applied voltage. Also, only about 50% of the silica powder injected through the nozzle into the bulb is actually coated, the other 50% passing through the return conduit 78.

When the silica smoke is forced through the nozzles, the particles carry a small net-negative charge, i.e. there are more negatively-charged particles than positively-charged particles. This is perhaps due to the stainless steel of which the nozzle is fabricated and apparently this is responsible for a slightly better powder deposition on the bulb when the bulb wall is made positive with respect to the probe, although very satisfactory coatings can be obtained when the bulb wall is made negative with respect to the probe.

Charging of the particles through static friction before application of a high voltage to direct the charged particles to the bulb wall represents a general departure in mechanism from that mechanism which is generally accepted as customary in the electrical-precipitation art. In explanation of this, in the usual electrical precipitation the particles are charged by means of gaseous ions or electrons as opposed to a static-frictional charging through turbulence. The charged particles are then transported to the collecting electrode by the force exerted on the particles by the electric field, and the charged particles are then discharged at the collecting electrode. Thus the electrostatic deposition of this invention apparently differs from the conventional electrical precipitation in the particle charging means wherein substantially all particles within the field are deposited.

As a specific example for silica coating a bulb designed for a 100 w. lamp, the nozzle-injector assembly has eight, evenly spaced nozzles, circumferentially disposed about the probe and each having a diameter of 46 mils. As heretofore noted, the preferred pressure in the smoke generator may vary between 6 and 12 pounds. In coating a bulb adapted for 100 watt operation, the butterfly valve 64 may be opened for about 2 seconds while applying a high tension D.C. of 15 kv. between the bulb wall and the probe. This will deposit approximately 50 mg. of silica onto the bulb. In coating bulb sizes other than the size adapted for 100 watt operation, the number of nozzles which may be used may vary depending on the bulb size. Alternatively, fewer nozzles having a larger diameter or more nozzles having a smaller diameter may be used in the nozzle assembly to coat identical bulbs in order to achieve the same coating result. The nozzle assembly thus constitutes a diffusing orifice which projects charged particles into the heated bulb.

After being coated the bulb is baked or lehred while rotated on the lava chuck, as illustrated in Fig. 9. Bulb lehring is necessary to drive off moisture which may have accumulated during coating and to render the silica coating as "moisture possessive or acquisitive" as possible. The lehring may be accomplished by gas-air burners 42, as illustrated, and the lehring temperatures may vary considerably depending on the prior processing of the silica coating powder and the conditions under which the processed lamp is intended to operate. For example, if a silica powder is fired before the coating operation at a temperature of about 500° C. for a sufficient time to approach steady-state conditions with regard to moisture content, a bulb lehr of 350° C. for a period of 10 to 20 seconds will normally be sufficient for the silica coating to have sufficient affinity for moisture to provide an improved lumen-maintenance at normal-operation minimum envelope temperatures, provided the mount is sealed-in, lamp exhausted, gas-fill inserted and exhaust tube tipped-off while the bulb is still hot, thus preventing the silica coating from repossessing appreciable amounts of moisture from the atmosphere between the coating, sealing-in and tipping-off operations.

In order to insure adequate moisture-free conditions for the silica coating, particularly where it is desired to operate under high temperature conditions, it is desirable to lehr the coated bulb at from 400° C. to 500° C. for about 10 to 20 seconds and even at this lehring temperature range it is desirable to simultaneously flush the coated lamp with hot, dry air, or other gas at a temperature of about 250° C., for example, to carry away all possible moisture. The air flush temperature is not particularly critical and may vary from about 150° C. to the lehring temperature of the bulb.

If the silica powder has not been baked or fired before the coating operation, higher lehring temperatures preferably are used while simultaneously flushing the bulb with hot dry air. For example, a bake or lehr of 450° C. for about 15 seconds is not considered excessive where a relatively moist, unfired, silica coating must be "activated" to impart thereto adequate "moisture gettering ability" for normal lamp operation.

Immediately following the lehring operation and while the bulb is still hot, the mount is sealed in as illustrated in Fig. 10. It is desirable to flush the bulb with hot, dry nitrogen, or other inert gas, while sealing the mount to the bulb neck in order to remove any moisture which may accumulate from the sealing fires, which are normally provided by gas-air burners, as is usual. Such hot, dry-nitrogen flushing is preferably accomplished through the exhaust tube 80 in order to maintain a slight pressure within the bulb to force any moisture out of the neck.

Immediately following the sealing-in operation, and while the bulb portion of the envelope is still hot, the lamp is exhausted through the exhaust tube, the gas-fill inserted and the exhaust tube tipped-off, as is customary. It may be desirable to further bake the bulb on exhaust to insure that all possible moisture is removed to give the silica coating all possible "moisture gettering ability." Baking on exhaust is not absolutely necessary, but is desirable, particularly where the processed lamp is to be operated in hot-recessed or other high-temperature-type fixtures.

After tipping-off, the lamp base is cemented to the neck and the lead-in conductors connected by well-known lamp basing techniques (basing operation not shown).

The main purpose of a lamp envelope diffusing coating is to diffuse and soften the light emitted by the incandescent filament. Thus the performance of any diffusing coating can be evaluated by the amount of diffusion effected as compared to the percentage of light which is transmitted through the coated, light-diffusing envelope. There are illustrated in Fig. 11 curves showing the observed brightness in candles per sq. cm. vs. distance from the neck of the bulb to the top measured in a plane perpendicular to the filament. All filaments used in these measurements were type CC6. It should be noted that the observed brightness measurements represented in Fig. 11 were integrated over a circular area of the lamp surface approximately 0.1" in diameter (roughly 0.008 sq. in.). It is obvious that by increasing the integrated area, "hot spots" will be smoothed out in the observed brightness measurements, or vice-versa, by decreasing the integrated area, "hot spots" can be intensified. Thus whenever brightness measurements, as illustrated in Fig. 11, are to be evaluated, the area over which such measurements are integrated should be indicated in order that the observed data may be given the proper evaluation. The curves of Fig. 11 are identified as follows. Curve "N" represents a standard acid-etch, inside-frost bulb. Curve "O" represents an electrostatically-deposited silica coating on an acid-etched, inside-frost bulb. Curve "P" represents an electrostatically deposited silica coating on a clear-glass bulb. Curve "Q" represents a burned ethyl orthosilicate silica coating on an acid-etched, inside-frost bulb. Curve "R" represents a silica coating on an acid-etched, inside-frost bulb, which coating is applied by spraying onto a hot bulb a silica aquasol containing large particles of silica. Curve "S" represents a silica coating on an acid-etched, inside-frost bulb, which coating is applied by flushing a 900° C. fired silica powder onto the bulb. As observed, the general shape of all of these curves, with the exception of the inside-frost bulb which is shown for purposes of comparison, is substantially similar and the maximum observed brightness for each type of coated lamp is given in the following table; designated Table II,

*Table II*

| Lamp type: | Maximum brightness in candles per sq. cm. |
| --- | --- |
| Acid-etched, inside-frost bulb | 28.0 |
| Electrostatically-applied silica coating on inside-frost bulb | 7.4 |
| Electrostatically-applied silica coating on clear-glass bulb | 7.2 |
| Burned ethyl orthosilicate coating of silica on inside-frost bulb | 7.3 |
| Silica aquasol containing large silica particles sprayed onto hot inside-frost bulb | 7.8 |
| Flush coating of 900° C. fired silica on inside-frost bulb | 8.2 |

It will be observed that the maximum brightness for the electrostatically-applied silica coatings, both on clear and inside-frost type bulbs, and the maximum brightness for the burned ethyl orthosilicate coatings when applied to inside-frost bulbs are equivalent. The maximum brightness for the flush-coated lamps is comparatively greater, i.e., the diffusion effected by such coatings is somewhat less. The maximum brightness for the silica aquasol-large silica particle coatings on inside-frost bulbs approaches that of the electrostatically-applied silica coatings.

As previously noted, the light-diffusion efficiency for a lamp envelope coating must be measured by the relative transmission efficiency as well as by the actual diffusion effected by the coating. It is obvious that a very heavy silica coating will be an excellent diffusing means, although the coating transmission efficiency may be sufficiently low as to render such coatings relatively poor (i.e., excessively absorptive of light). Thus, in order to evaluate further the foregoing types of coatings, the light-transmission efficiency for these coatings were tested and the results are given in the following table. In conducting the coating-transmission-efficiency tests, open-necked bulbs were placed over a standard light source in a photometry sphere. A sensitive, linear-responsive photocell, shielded from direct radiation from the standard source, indicated the transmitted-light intensity, which indication is relative to the intensity of the standard source. For example, the standard light source was energized within the sphere and the photocell output noted. This reading represents the 100% value. The bulb whose transmission efficiency was to be measured was placed over the standard light source and the photocell output measurement noted. This photocell measurement was then corrected to indicate a percentage reading as compared to the intensity of the standard light source. The transmission efficiencies for the heretofore-discussed various types of envelope diffusing coatings were as indicated below in Table III. Also indicated for purposes of comparison are the transmission efficiencies for clear-glass bulbs and inside-frost bulbs.

*Table III*

| Lamp bulb type: | Transmission efficiency in percent |
| --- | --- |
| Standard light source | 100 |
| Clear-glass bulb | 99 |
| Acid-etch, inside-frost bulb | 98.9 |
| Electrostatically-applied silica coating on clear-glass bulb | 97.2 |
| Electrostatically-applied silica coating on inside-frost bulb | 97.2 |
| Burned ethyl orthosilicate on inside-frost bulb | 96.3 |
| Silica aquasol-large silica particles sprayed on hot inside-frost bulb | 95.5 |
| 900° C. fired silica powder flushed on inside-frost bulb | 96.7 |

It will be observed that as compared to a standard acid-etched, inside-frost bulb, the electrostatically-applied silica coatings have a transmission efficiency which is 1.7% lower. An equivalent burned ethyl orthosilicate coating on an inside-frost bulb has a transmission efficiency which is 2.6% lower than an inside-frost type bulb. An equivalent silica aquasol-large silica particle, hot-bulb-sprayed coating has a transmission efficiency which is 3.4% lower than a standard inside-frost bulb. Thus for an equivalent diffusion (see the foregoing tables listing maximum observed brightness) an electrostatically-applied silica coating has a transmission efficiency which more nearly approaches a standard acid-etch, inside-frost type bulb than the silica-coated bulbs of the prior art.

It will be recognized that the objects of the invention have been achieved by the provision of a method for coating light-diffusing silica onto an incandescent lamp envelope so that the coated silica also acts as a moisture getter to improve the lumen maintenance of the finished lamp.

As a possible alternative embodiment, the electrostatically-applied silica may be steamed to increase adherence. Such steamed silica coatings can still be made to act as a moisture getter with the proper processing. In this case, a slightly longer and hotter bulb lehr is required to render the silica moisture hungry, e.g., a 475° C. lehr for about 15 seconds. Also, the electrostatically-applied silica may be neck steamed, that is, only the neck of the envelope may be steamed to increase adherence of the silica coating for the glass at this point, since imperfections arising from insufficient adherence most often occur at the neck of the lamp.

While in accordance with the patent statutes, one best embodiment has been illustrated and described in detail, it is to be particularly understood that the invention is not limited thereto or thereby.

We claim:

1. The process of applying finely-divided, porous, generally-amorphous silica to an incandescent lamp envelope having an open neck, comprising evenly applying said silica to the interior surface of said envelope, limiting the temperatures to which said silica is subjected before, during, and after coating to not more than 625° C., lehring said silica-coated envelope so that at normal-operation minimum lamp envelope temperatures said silica coating will constitute a getter for at least 0.4% by weight of additional moisture, and hermetically sealing a mount to said neck and tipping-off while maintaining said silica coating within the aforestated moisture gettering condition.

2. The process of applying finely-divided, porous, generally-amorphous silica to an incandescent lamp envelope having an open neck, comprising evenly applying said silica to the interior surface of said envelope, limiting the temperatures to which said silica is subjected before, during and after coating to not more than 625° C., lehring said coated envelope so that said silica coating will have from 1.55% to 4.8% by weight of moisture and so that at normal-operation minimum lamp envelope temperatures said silica coating will constitute a getter for at least 0.4% by weight of additional moisture, and hermetically sealing a mount to said neck and tipping-off while maintaining said silica coating within the aforestated moisture limitations and moisture gettering condition.

3. The process of applying finely-divided, porous, generally-amorphous silica to an incandescent lamp envelope having an open neck, comprising electrostatically applying said silica to the interior surface of said envelope, limiting the temperatures to which said silica is subjected both before, during and after coating to not more than 625° C., lehring said coated envelope so that said silica coating will have from 1.55% to 4.8% by weight of moisture and so that at normal-operation minimum lamp envelope temperatures said silica coating will constitute a getter for at least 0.4% by weight of additional moisture, and hermetically sealing a mount to said neck and tipping-off while maintaining said silica coating within the aforestated moisture limitations and moisture gettering condition.

4. The process of applying finely-divided, porous, generally-amorphous silica to an incandescent lamp envelope having an open neck, comprising electrostatically applying said silica to the interior surface of said envelope, limiting the temperatures to which said silica is subjected both before, during and after coating to not more than 625° C., lehring said coated envelope so that said silica coating will have from 1.55% to 4.0% by weight of moisture and so that at normal-operation minimum lamp envelope temperatures said silica coating will constitute a getter for at least 0.4% by weight of additional moisture, and hermetically sealing a mount to said neck and tipping-off while maintaining said silica coating within the aforestated moisture limitations and moisture gettering condition.

References Cited in the file of this patent

UNITED STATES PATENTS

| | | |
| --- | --- | --- |
| 2,521,642 | Massa | Sept. 5, 1950 |
| 2,538,562 | Gustin et al. | Jan. 16, 1951 |
| 2,699,371 | Meister | Jan. 11, 1955 |
| 2,811,131 | Lopenski et al. | Oct. 29, 1957 |